US009803734B2

(12) United States Patent
Bedert

(10) Patent No.: US 9,803,734 B2
(45) Date of Patent: Oct. 31, 2017

(54) METHOD FOR OPERATING A VEHICLE DRIVELINE

(71) Applicant: Dana Belgium N.V., Bruges (BE)

(72) Inventor: Jan Bedert, Oostduinkerke (BE)

(73) Assignee: Dana Belgium N.V, Maumee, OH (US)

( * ) Notice: Subject to any disclaimer, the term of this patent is extended or adjusted under 35 U.S.C. 154(b) by 504 days.

(21) Appl. No.: 13/261,933

(22) PCT Filed: Jan. 24, 2013

(86) PCT No.: PCT/EP2013/051344
§ 371 (c)(1),
(2) Date: Jul. 21, 2014

(87) PCT Pub. No.: WO2013/110707
PCT Pub. Date: Aug. 1, 2013

(65) Prior Publication Data
US 2015/0075146 A1    Mar. 19, 2015

Related U.S. Application Data

(60) Provisional application No. 61/589,987, filed on Jan. 24, 2012.

(51) Int. Cl.
| F16H 61/4017 | (2010.01) |
|---|---|
| F16H 39/04 | (2006.01) |
| F16H 61/4043 | (2010.01) |
| B60W 30/18 | (2012.01) |
| E02F 9/22 | (2006.01) |

(Continued)

(52) U.S. Cl.
CPC ....... *F16H 39/04* (2013.01); *B60W 30/18109* (2013.01); *E02F 9/2253* (2013.01); *E02F 9/2289* (2013.01); *E02F 9/2296* (2013.01); *F16H 47/04* (2013.01); *F16H 61/4043* (2013.01); *B60W 2510/1045* (2013.01); *B60W 2520/105* (2013.01); *F16H 61/4017* (2013.01);
(Continued)

(58) Field of Classification Search
CPC ...................... F16H 2047/045; F16H 61/4017
See application file for complete search history.

(56) References Cited

U.S. PATENT DOCUMENTS

| 4,653,271 | A | * | 3/1987 | Reeves | ............... | F16H 61/4043 |
|---|---|---|---|---|---|---|
| | | | | | | 60/494 |
| 4,727,718 | A | * | 3/1988 | Koopmans | ............... | B66D 1/44 |
| | | | | | | 60/468 |

(Continued)

FOREIGN PATENT DOCUMENTS

DE          19856544 A1      8/1999

*Primary Examiner* — F. Daniel Lopez
(74) *Attorney, Agent, or Firm* — Marshall & Melhorn, LLC

(57) ABSTRACT

A method of operating a driveline including a powersplit transmission is provided. The driveline may be operated in a hydrostatic power transmission mode and a blended hydrostatic/mechanical power transmission mode. The method comprises the steps of providing a hydrostatic circuit, detecting a rapid deceleration of the vehicle, and adjusting a threshold of at least one pressure relief valve forming a portion of the hydrostatic circuit in response to the sudden deceleration. The at least one pressure relief valve facilitates quickly changing the driveline from the blended hydrostatic/mechanical power transmission mode to the hydrostatic power transmission mode.

7 Claims, 5 Drawing Sheets

(51) Int. Cl.
*F16H 47/04* (2006.01)
*F16H 37/08* (2006.01)

(52) U.S. Cl.
CPC ............... *F16H 2037/0886* (2013.01); *F16H 2200/2005* (2013.01); *F16H 2200/2041* (2013.01)

(56) References Cited

U.S. PATENT DOCUMENTS

| | | | | |
|---|---|---|---|---|
| 5,684,694 | A * | 11/1997 | Ishino | F16H 47/04 475/76 |
| 6,109,031 | A * | 8/2000 | Katagiri | F16H 47/04 60/431 |
| 6,260,440 | B1 * | 7/2001 | Cronin | F16H 47/04 475/76 |
| 6,595,885 | B1 | 7/2003 | Lutgen | |

* cited by examiner

| OPERATIONING MODE | POWER SOURCE | VARIABLE DISPLACEMENT MOTOR ROTATION | VEHICLE OUTPUT ROTATION | FORWARD CLUTCH STATE | REVERSE CLUTCH STATE | PRIMARY RANGE CLUTCH STATE | SECONDARY RANGE CLUTCH STATE |
|---|---|---|---|---|---|---|---|
| FORWARD POWERSPLIT MODE | POSITIVE | FROM MAX NEGATIVE SPEED TO MAX POSITIVE SPEED WITH INCREASING POSITIVE VEHICLE SPEED | POSITIVE | ENGAGED | DISENGAGED | DISENGAGED | ENGAGED |
| FORWARD HYDROSTATIC MODE | POSITIVE | FROM ZERO TO MAX NEGATIVE SPEED WITH INCREASING POSITIVE VEHILCE SPEED | POSITIVE | DISENGAGED | DISENGAGED | ENGAGED | ENGAGED |
| STANDSTILL | POSITIVE | ZERO SPEED | ZERO SPEED | DISENGAGED | DISENGAGED | ENGAGED | ENGAGED |
| REVERSE HYDROSTATIC MODE | POSITIVE | ROTATE FROM ZERO TO MAX NEGATIVE SPEED WITH INCREASING VEHICLE POSITIVE SPEED | NEGATIVE | DISENGAGED | DISENGAGED | ENGAGED | ENGAGED |
| REVERSE POWERSPLIT MODE | POSITIVE | FROM POSITIVE SPEED TO NEGATIVE SPEED WITH INCREASING NEGATIVE VEHICLE SPEED | NEGATIVE | DISENGAGED | ENGAGED | DISENGAGED | ENGAGED |

FIG. 4

METHOD FOR OPERATING A VEHICLE DRIVELINE

CLAIM OF PRIORITY

The present application claims priority to and incorporates by reference U.S. Provisional Application No. 61/589,987 filed Jan. 24, 2012, entitled "FREEWHEEL DEVICE FOR HYDROSTATIC GROUP IN A POWERSPLIT TRANSMISSION."

BACKGROUND OF THE INVENTION

Certain powersplit transmissions suffer from their associated power sources, such as an internal combustion engine, stalling when the vehicle encounters a load, such as when the vehicle enters a pile of aggregate material. The vehicle may be, by way of example, a wheel loader. In most cases, the stall condition occurs when the transmission is in a driving gear configuration used for higher speeds.

Typically, the stall occurs because the output of the transmission maintains driving engagement with the power source and the overall transmission ratio set cannot follow the fast deceleration (speed gradient) that the vehicle is subjected to when entering a pile. At a certain point, the power source is unable to deliver the requested drive torque, which results in an engine stall.

In a wheel loader equipped with a conventional powersplit transmission, this rapid changing ratio set is in the first instance accomplished by the torque converter. When the wheel loader is entering a pile (typically in a driving gear configuration used for higher speeds) the speed ratio of the torque converter changes from a high value (for example approximately 0.8 to approximately 0.9, which is typically associated with a driving mode) to a rather low value, or even zero (stall condition).

Another advantage of the torque converter is that the torque received from the engine is increased during the stall condition with a factor (typically a factor of 2 to 3 in these applications), enhancing the push power of the machine. To even further increase the push power of the machine, a downshift may be made from the second driving gear to the first driving gear to obtain a maximum push power available from the vehicle. This downshift typically occurs with an interruption in the torque delivered by the vehicle.

In order to overcome the above-mentioned deficiency, the transmission may be put into neutral. The vehicle thus comes to a full stop, such as during pile entry. Re-initialization of the drive train is then required prior to resuming the actual operation. This solution significantly compromises the performance of the wheel loader to a negative extent and therefore is unacceptable for modern vehicles. Generally, transmissions convert power from the power source, for example a diesel engine, to the drive axles of the vehicle. Some transmissions have a powersplit configuration. This means that power can be transferred by using a hydraulic branch, a mechanical branch or a combination of both branches used together.

Powersplit transmissions can be operated in different modes. In a first drive range, the transmission is operated in the hydrostatic mode, where only a hydrostatic motor drives an output of the vehicle. In a second or a third drive range, the transmission is operated in the powersplit mode, where a combination of the hydraulic branch and the mechanical branch of the transmission are used to drive the output of the vehicle.

It would be advantageous to develop a method of operating a driveline including a power split transmission that militates against a torque interruption from occurring during a shifting procedure and militates against a stall condition from occurring.

SUMMARY OF THE INVENTION

Presently provided by the invention, a method of operating a driveline including a power split transmission that militates against a torque interruption from occurring during a shifting procedure and militates against a stall condition from occurring, has surprisingly been discovered.

In one embodiment, the present invention is directed to a method of operating a driveline including a powersplit transmission. The driveline may be operated in a hydrostatic power transmission mode and a blended hydrostatic/mechanical power transmission mode. The method comprises the steps of providing a hydrostatic circuit, detecting a rapid deceleration of the vehicle, and adjusting a threshold of at least one pressure relief valve forming a portion of the hydrostatic circuit in response to the sudden deceleration. The at least one pressure relief valve facilitates quickly changing the driveline from the blended hydrostatic/mechanical power transmission mode to the hydrostatic power transmission mode.

Various aspects of this invention will become apparent to those skilled in the art from the following detailed description of the preferred embodiment, when read in light of the accompanying drawings.

BRIEF DESCRIPTION OF THE DRAWINGS

The present invention will become readily apparent to those skilled in the art from the following detailed description when considered in the light of the accompanying drawings in which:

FIG. 4 is a table indicating an engagement status of each of a plurality of components of the power split transmission in each of the operating modes a vehicle driveline including the powersplit transmission may be placed in.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless expressly stated otherwise.

Figure 1:
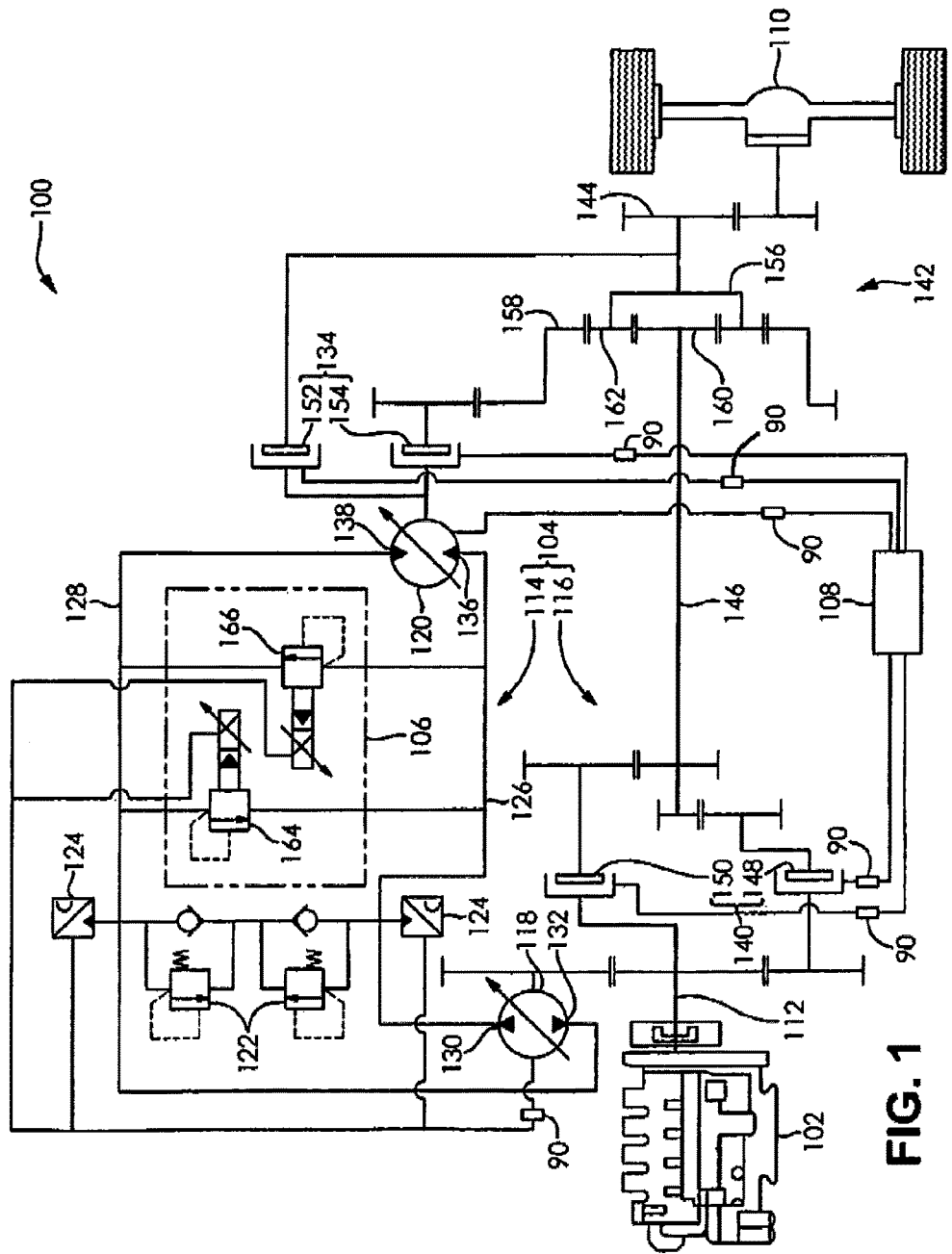
FIG. 1 is a schematic depiction of a powersplit transmission according to an embodiment of the present invention.

FIG. 1 illustrates a vehicle driveline 100. The vehicle driveline 100 comprises a power source 102, a powersplit transmission 104, a freewheel device 106, a controller 108, and a vehicle output 110. The power source 102 is drivingly engaged with the powersplit transmission 104. The powersplit transmission 104 is drivingly engaged with the vehicle output 110. The freewheel device 106 is in fluid communication with a portion of the powersplit transmission 104. It is understood that the powersplit transmission 104 illustrated in FIG. 1 is merely exemplary in nature, and that the freewheel device 106 and the controller 108 may be used with any powersplit transmission.

The power source 102 is an internal combustion engine as is known in the art. However, it is understood the power source 102 may be another type of power source such as an electric motor, for example. The power source 102 rotates a transmission input 112. A transmission (not shown) or a clutching device (not shown) may be disposed between the power source 102 and the transmission input 112 to permit selective engagement of the power source 102 with the transmission input 112. Further, the transmission or the clutching device may be used to modify a characteristic of a power transferred from the power source 102 to the powersplit transmission 104.

The powersplit transmission 104 comprises a hydrostatic circuit 114 and a mechanical portion 116. A variable displacement pump 118 and a variable displacement motor 120 of the hydrostatic circuit 114 are drivingly engaged with the mechanical portion 116.

The hydrostatic circuit 114 comprises the variable displacement pump 118, a variable displacement motor 120, a pair of safety valves 122, a pair of pressure transducers 124, a first drive fluid conduit 126, and a second drive fluid conduit 128.

The variable displacement pump 118 is a hydraulic axial piston pump having a movable swashplate (not shown). However, it is understood the variable displacement pump 118 may be any other type of variable displacement pump. A position of the movable swashplate is determined in response to a signal received by the variable displacement pump 118 from the controller 108, which the variable displacement pump 118 is in communication with. The variable displacement pump 118 is drivingly engaged with the power source 102 through the transmission input 112. A first fluid port 130 of the variable displacement pump 118 is in fluid communication with the first drive fluid conduit 126. A second fluid port 132 of the variable displacement pump 118 is in fluid communication with the second drive fluid conduit 128.

The variable displacement motor 120 is a hydraulic axial piston pump having a movable swashplate (not shown). However, it is understood the variable displacement motor 120 may be any other type of variable displacement motor. A position of the movable swashplate is determined in response to a signal received by the variable displacement pump 118 from the controller 108, which the variable displacement pump 118 is in communication with. The variable displacement motor 120 is drivingly engaged with a drive range selector 134 of the mechanical portion 116. A first fluid port 136 of the variable displacement motor 120 is in fluid communication with the first drive fluid conduit 126. A second fluid port 138 of the variable displacement motor 120 is in fluid communication with the second drive fluid conduit 128.

The pair of safety valves 122 is in fluid communication with the first drive fluid conduit 126 and the second drive fluid conduit 128. One of the pair of safety valves 122 is configured to sense a fluid pressure within the first drive fluid conduit 126 and the remaining one of the pair of safety valves 122 is configured to sense a fluid pressure within the second drive fluid conduit 128. The pair of safety valves 122 is configured to facilitate fluid communication between the first drive fluid conduit 126 and the second drive fluid conduit 128 when a fluid pressure within one of the first drive fluid conduit 126 and the second drive fluid conduit 128 is above a safety threshold. It is understood that the pair of safety valves 122 shown in FIG. 1 is merely exemplary in nature and that the pair of safety valves 122 may be replaced with any fluid power safety device, which are commonly known in the art.

The pair of pressure transducers 124 is in communication with the controller 108. The pair of pressure transducers 124 is configured to sense a fluid pressure within the first drive fluid conduit 126 and the second drive fluid conduit 128 and relay the fluid pressure within the drive fluid conduits 126, 128 using a signal. It is understood that the arrangement of pressure transducers 124 shown in FIG. 1 and the communication between the pressure transducers 124 and the controller 108 described hereinabove is merely exemplary in nature and that the pressure transducers 124 may be arranged or operated in any conventional manner.

The first drive fluid conduit 126 are conduits used in hydraulic power systems as is known in the art. The first drive fluid conduit 126 may comprise flexible conduits, rigid conduits, or conduits formed within other components of the powersplit transmission 104. The first drive fluid conduit 126 is in fluid communication with the variable displacement pump 118 through the first fluid port 130 and the variable displacement motor 120 through the first fluid port 136.

The second drive fluid conduit 128 are conduits used in hydraulic power systems as is known in the art. The second drive fluid conduit 128 may comprise flexible conduits, rigid conduits, or conduits formed within other components of the powersplit transmission 104. The second drive fluid conduit 128 is in fluid communication with the variable displacement pump 118 through the second fluid port 132 and the variable displacement motor 120 through the second fluid port thereof 138.

The mechanical portion 116 comprises a transmission input 112, a directional selector 140, the drive range selector 134, a planetary gearset 142, and a transmission output 144. The transmission input 112 is a geared shaft drivingly engaged with the variable displacement pump 118 and the drive range selector 140. The drive range selector 140 is also drivingly engaged with the planetary gearset 142 through an intermediate shaft 146. The planetary gearset 142 is also drivingly engaged with the drive range selector 134 and the transmission output 144. The transmission output 144 is a gear which is also drivingly engaged with the vehicle output 110.

The directional selector 140 comprises a forward clutch 148 and a reverse clutch 150. The forward clutch 148 and the reverse clutch 150 are each drivingly engaged with the transmission input 112 and the intermediate shaft 146. The forward clutch 148 and the reverse clutch 150 are in communication with the controller 108.

The forward clutch 148 is a clutching device which may be variably engaged in response to a signal received from the controller 108. When the forward clutch 148 is in an engaged position, torque applied to the transmission input 112 is applied to the intermediate shaft 146 through the forward clutch 148. The forward clutch 148 may be a plate clutch, a cone clutch, or any other type of clutch that may be variably engaged. The forward clutch 148 is a hydraulically operated clutch; however, it is understood that the forward clutch 148 may be operated in any other manner.

The reverse clutch 150 is a clutching device which may be variably engaged in response to a signal received from the controller 108. When the reverse clutch 150 is in an engaged position, torque applied to the transmission input 112 is applied to the intermediate shaft 146 through the reverse clutch 150. The reverse clutch 150 reverses a rotational direction of the intermediate shaft 146 when compared to the forward clutch 148. The reverse clutch 150 may be a plate clutch, a cone clutch, or any other type of clutch that may be variably engaged. The reverse clutch 150 is a hydraulically operated clutch; however, it is understood that the reverse clutch 150 may be operated in any other manner.

The drive range selector 134 comprises a primary range clutch 152 and a secondary range clutch 154. The primary range clutch 148 and the secondary range clutch 152 are each drivingly engaged with the variable displacement motor 120 and the planetary gearset 142. The primary range clutch' 148 and the secondary range clutch 152 are in communication with the controller 108.

The primary range clutch 152 is a clutching device which may be variably engaged in response to a signal received from the controller 108. When the primary range clutch 152 is in an engaged position, torque applied by an output of the variable displacement motor 120 is applied to a carrier 156 of the planetary gearset 142 through the primary range clutch 152. The primary range clutch 152 may be a plate clutch, a cone clutch, or any other type of clutch that may be variably engaged. The primary range clutch 152 is a hydraulically operated clutch; however, it is understood that the primary range clutch 152 may be operated in any other manner.

The secondary range clutch 154 is a clutching device which may be variably engaged in response to a signal received from the controller 108. When the secondary range clutch 154 is in an engaged position, torque applied by an output of the variable displacement motor 120 is applied to a ring gear 158 of the planetary gearset 142 through the secondary range clutch 154. The secondary range clutch 154 may be a plate clutch, a cone clutch, or any other type of clutch that may be variably engaged. The secondary range clutch 154 is a hydraulically operated clutch; however, it is understood that the secondary range clutch 154 may be operated in any other manner.

The planetary gearset 142 comprises a sun gear 160, a carrier 156 including a plurality of planet gears 162 rotatably disposed thereon, and a ring gear 158. The sun gear 160, the carrier 156 including the plurality of planet gears 162 rotatably disposed thereon, and the ring gear 158 form an epicyclic gearset which is common and known in the art. The sun gear 160 is drivingly engaged with the intermediate shaft 146. The carrier 156 is drivingly engaged with a portion of the primary range clutch 152 and the transmission output 144. The ring gear 158 is drivingly engaged with a portion of the secondary range clutch 154.

The freewheel device 106 illustrated in FIG. 1 comprises a first pressure relief valve 164 and a second pressure relief valve 166.

The first pressure relief valve 164 is in fluid communication with the first drive fluid conduit 126 and the second drive fluid conduit 128. The first pressure relief valve 164 is also in communication with the controller 108, and the first pressure relief valve 164 is configured to be operated in a proportional manner by the controller 108 in response to a fluid pressure of the first drive fluid conduit 126. When the first pressure relief valve 164 is placed in an open or a partially open position, fluid communication between the first drive fluid conduit 126 and the second drive fluid conduit 128 is afforded.

The second pressure relief valve 166 is in fluid communication with the first drive fluid conduit 126 and the second drive fluid conduit 128. The second pressure relief valve 166 is also in communication with the controller 108, and the second pressure relief valve 164 is configured to be operated in a proportional manner by the controller 108 in response to a fluid pressure of the second drive fluid conduit 128. When the second pressure relief valve 166 is placed in an open or a partially open position, fluid communication between the first drive fluid conduit 126 and the second drive fluid conduit 128 is afforded.

The controller 108 is in communication with the variable displacement pump 118, the variable displacement motor 120, the pair of pressure transducers 124, the forward clutch 148, the reverse clutch 150, the primary range clutch 152, the secondary range clutch 154, the first pressure relief valve 164, and the second pressure relief valve 166. The controller 108 may be in one of an electrical, a hydraulic, a pneumatic, and a wireless communication with the variable displacement pump 118, the variable displacement motor 120, each of the pressure transducers 124, the forward clutch 148, the reverse clutch 150, the primary range clutch 152, the secondary range clutch 154, the first pressure relief valve 164, and the second pressure relief valve 166.

The controller 108 receives a signal from the pair of pressure transducers 124 in response to the fluid pressure within the drive fluid conduits 126, 128. The variable displacement pump 118, the variable displacement motor 120, the forward clutch 148, the reverse clutch 150, the primary range clutch 152, the secondary range clutch 154 each receive a signal from the controller 108 to control a position of the moveable swashplate or an engagement thereof. The first pressure relief valve 164 and the second pressure relief valve 166 each receive a signal from the controller 108 to control an engagement thereof in a proportional manner. The controller 108 includes at least one of a predetermined set of instructions and conditions that are used to determine a signal sent to each of the each of the variable displacement pump 118, the variable displacement motor 120, the pressure transducers 124, the forward clutch 148, the reverse clutch 150, the primary range clutch 152, the secondary range clutch 154, the first pressure relief valve 164, and the second pressure relief valve 166 in response to at least the signal the controller 108 receives from each of the pressure transducers 124.

The vehicle output 110 is in driving engagement with the transmission output 144. A shown in FIG. 1, the vehicle output 110 comprises an axle and wheel assembly; however, it is understood that the vehicle output 110 may be any other conventionally used drive assembly.

Figure 2:
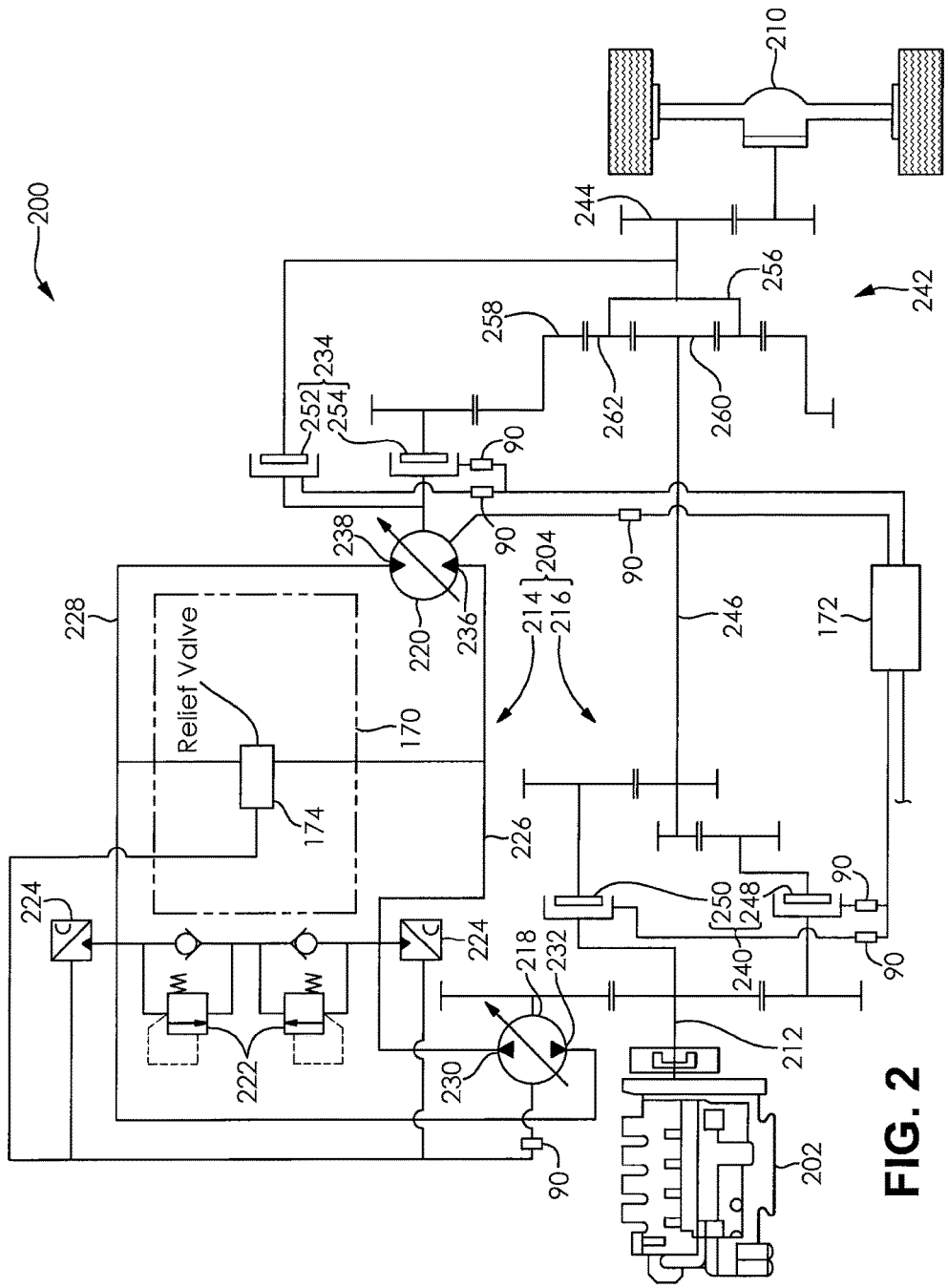
FIG. 2 is a schematic depiction of a powersplit transmission according to another embodiment of the present invention.

FIG. 2 illustrates an alternative embodiment of the vehicle driveline 100. Similar structural features of the hydrostatic driveline 100 are similarly referenced, with the exception of the below identified features.

A vehicle driveline 200 shown in FIG. 2 includes comprises a power source 202, a powersplit transmission 204, a freewheel device 170, a controller 172, and a vehicle output 210. The power source 202 is drivingly engaged with the powersplit transmission 204. The powersplit transmission 204 is drivingly engaged with the vehicle output 210. The freewheel device 170 is in fluid communication with a portion of the powersplit transmission 204. It is understood that the powersplit transmission 204 illustrated in FIG. 2 is merely exemplary in nature, and that the freewheel device 170 and the controller 172 may be used with any powersplit transmission.

The freewheel device 170 illustrated in FIG. 2 comprises a relief valve 174.

The relief valve 174 is in fluid communication with a first drive fluid conduit 226 and a second drive fluid conduit 228. The relief valve 174 is also in communication with the controller 172, and the relief valve 174 is configured to be operated in a proportional manner by the controller 172 in response to a fluid pressure of the first drive fluid conduit 226 and the second fluid drive conduit 228. When the relief valve 174 is placed in an open or a partially open position, fluid communication between the first drive fluid conduit 226 and the second drive fluid conduit 228 is afforded.

The controller 172 is in communication with a variable displacement pump 218, a variable displacement motor 220, a pair of pressure transducers 224, a forward clutch 248, a reverse clutch 250, a primary range clutch 252, a secondary range clutch 254, and the relief valve 174. The controller 172 may be in one of an electrical, a hydraulic, a pneumatic, and a wireless communication with the variable displacement pump 218, the variable displacement motor 220, each of the pressure transducers 224, the forward clutch 248, the reverse clutch 250, the primary range clutch 252, the secondary range clutch 254, and the relief valve 174.

The controller 172 receives a signal from the pair of pressure transducers 224 in response to the fluid pressure within the drive fluid conduits 226, 228. The variable displacement pump 218, the variable displacement motor 220, the forward clutch 248, the reverse clutch 250, the primary range clutch 252, the secondary range clutch 254 each receive a signal from the controller 172 to control a position of the moveable swashplate or an engagement thereof. The relief valve 174 receives a signal from the controller 172 to control an engagement thereof in a proportional manner. The controller 172 includes at least one of a predetermined set of instructions and conditions that are used to determine a signal sent to each of the each of the variable displacement pump 218, the variable displacement motor 220, the pressure transducers 224, the forward clutch 248, the reverse clutch 250, the primary range clutch 252, the secondary range clutch 254, and the relief valve 174 in response to at least the signal the controller 172 receives from each of the pressure transducers 224.

A vehicle driveline 200 shown in FIG. 2 includes comprises a power source 202, a powersplit transmission 204, a freewheel device 170, a controller 172, and a vehicle output 210. The power source 202 is drivingly engaged with the powersplit transmission 204. The powersplit transmission 204 is drivingly engaged with the vehicle output 210. The freewheel device 170 is in fluid communication with a portion of the powersplit transmission 204. It is understood that the powersplit transmission 204 illustrated in FIG. 2 is merely exemplary in nature, and that the freewheel device 170 and the controller 172 may be used with any powersplit transmission.

Figure 3:
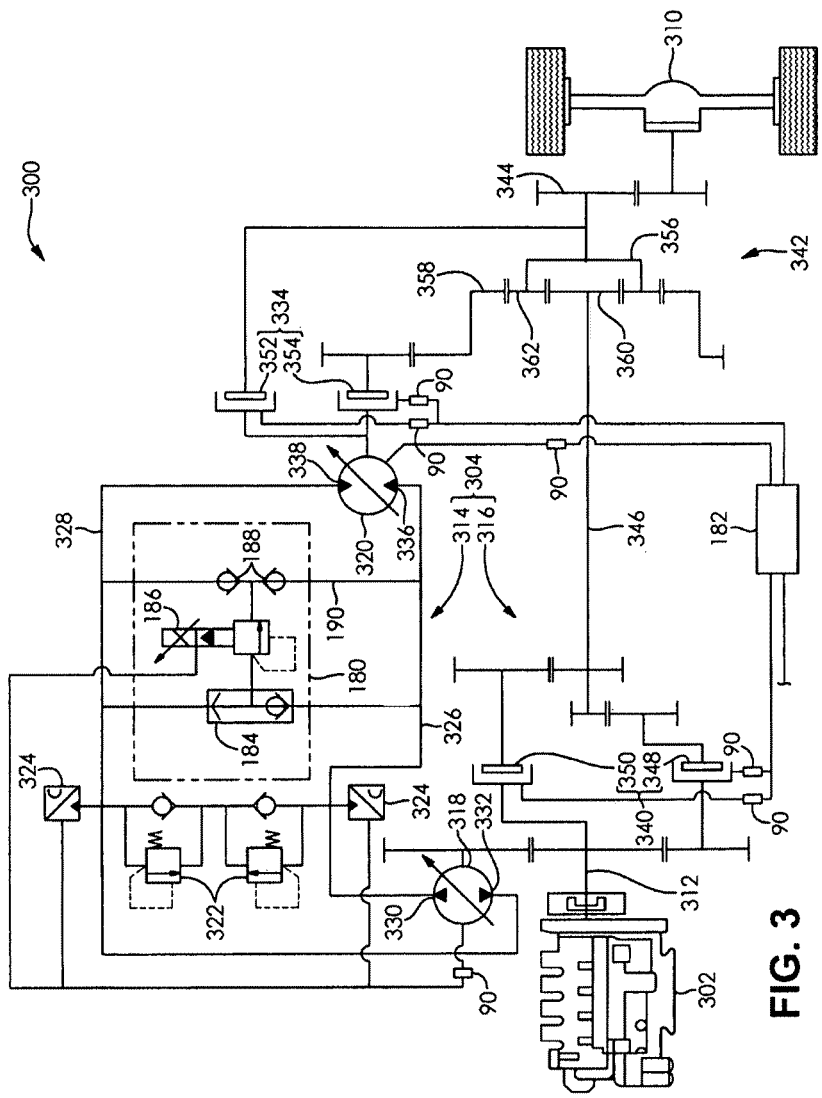
FIG. 3 is a schematic depiction of a powersplit transmission according to another embodiment of the present invention.

FIG. 3 illustrates an alternative embodiment of the vehicle driveline 100. Similar structural features of the hydrostatic driveline 100 are similarly referenced, with the exception of the below identified features.

A vehicle driveline 300 shown in FIG. 3 includes comprises a power source 302, a powersplit transmission 304, a freewheel device 180, a controller 182, and a vehicle output 310. The power source 302 is drivingly engaged with the powersplit transmission 304. The powersplit transmission 304 is drivingly engaged with the vehicle output 310. The freewheel device 180 is in fluid communication with a portion of the powersplit transmission 304. It is understood that the powersplit transmission 304 illustrated in FIG. 3 is merely exemplary in nature, and that the freewheel device 180 and the controller 182 may be used with any powersplit transmission.

The freewheel device 180 illustrated in FIG. 3 comprises a shuttle valve 184, a pressure relief valve 186, and a pair of check valves 188. The shuttle valve 184 is conventional and well known in the art and is in fluid communication with a first drive fluid conduit 326 and a second drive fluid conduit 328. The pair of check valves 188 is in fluid communication with the first drive fluid conduit 326 and the second drive fluid conduit 328. As shown in FIG. 3, the pair of check valves 188 is disposed on a bridging conduit 190 in opposing orientations to prevent fluid from each of the first drive fluid conduit 326 and the second drive fluid conduit 328 to a portion of the bridging conduit 190 between the pair of check valves 188.

The pressure relief valve 186 is in fluid communication with the shuttle valve 184 and the portion of the bridging conduit 190 between the pair of check valves 188. The pressure relief valve 186 is also in communication with the controller 182, and the pressure relief valve 186 is configured to be operated in a proportional manner by the controller 182 in response to a fluid pressure of the first drive fluid conduit 326 and the second fluid drive conduit 328. When the pressure relief valve 186 is placed in an open or a partially open position, fluid communication between one of the first drive fluid conduit 226 and the second drive fluid conduit 228, depending on whichever of the conduits 226, 228 has a greater pressure, and a remaining one of the first drive fluid conduit 226 and the second drive fluid conduit 228, through one of the pair of check valves 188, is afforded.

The controller 182 is in communication with a variable displacement pump 318, a variable displacement motor 320, a pair of pressure transducers 324, a forward clutch 348, a reverse clutch 350, a primary range clutch 352, a secondary range clutch 354, and the pressure relief valve 186. The controller 182 may be in one of an electrical, a hydraulic, a pneumatic, and a wireless communication with the variable displacement pump 318, the variable displacement motor 320, each of the pressure transducers 324, the forward clutch 348, the reverse clutch 350, the primary range clutch 352, the secondary range clutch 354, and the pressure relief valve 186.

The controller 182 receives a signal from the pair of pressure transducers 324 in response to the fluid pressure within the drive fluid conduits 326, 328. The variable displacement pump 318, the variable displacement motor 320, the forward clutch 348, the reverse clutch 350, the primary range clutch 352, the secondary range clutch 354 each receive a signal from the controller 182 to control a position of the moveable swashplate or an engagement thereof. The pressure relief valve 186 receives a signal from the controller 182 to control an engagement thereof in a proportional manner. The controller 182 includes at least one of a predetermined set of instructions and conditions that are used to determine a signal sent to each of the each of the variable displacement pump 318, the variable displacement motor 320, the pressure transducers 324, the forward clutch 348, the reverse clutch 350, the primary range clutch 352, the secondary range clutch 354, and the pressure relief valve 186 in response to at least the signal the controller 182 receives from each of the pressure transducers 324.

FIGS. 1-3 each contain transformation devices 90, such as valves, for transforming an electrical signal to a hydraulic signal, or vice versa. The devices 90 may be located anywhere between controllers 108, 172 and/or 182 and they devices they are controlling (e.g., motors, pumps, relief valves, etc.). Therefore, the location of the devices 90 in the figures is intended for illustrative purposes and should not be considered to be limiting.

Regardless of whether these devices are located between a controller and a motor, pump or valve, they effectively work in the same way to convert signals between the controller and the motor, pump or valve. The devices may vary in their construction, location or size with respect to one another depending on the load they are subject to, the physical space allotted to them, the environmental conditions they experience, or other factors, but they all function in essentially the same way. With the understanding that the devices essentially function in the same way, they have all been designated with reference number 90 even though they may have variations between them.

In use, the vehicle driveline 100, 200, 300 may be operated in a hydrostatic mode or in a powersplit mode. In the hydrostatic mode, the power source 102, 202, 302, through the hydrostatic circuit 114, 214, 314, solely drives the vehicle output 110, 210, 310. In the powersplit mode, the power source 102, 202, 302, through both the hydrostatic circuit 114, 214, 314 and the mechanical portion 116, 216, 316, drive the vehicle output 110, 210, 310.

In the powersplit mode, when the forward clutch 148, 248, 348 is engaged and the reverse clutch 150, 250, 350 is disengaged, the mechanical portion 116, 216, 316 can be considered to have a positive ratio. Conversely, when the reverse clutch 150, 250, 350 is engaged and the forward clutch 148, 248, 348 is disengaged, the mechanical portion 116, 216, 316 can be considered to have a negative ratio.

In the powersplit mode, the intermediate shaft 146, 246, 346, through one of the forward clutch 148, 248, 348 and the reverse clutch 150, 250, 350, drives the sun gear 160, 260, 360 of the planetary gearset 142, 242, 342. The variable displacement motor 120, 220, 320, through the secondary range clutch 154, 254, 354, drives the ring gear 158, 258, 358 of the planetary gearset 142, 242, 342. As the sun gear 160, 260, 360 and the ring gear 158, 258, 358 are driven, the carrier 156, 256, 356, through the planet gears 162, 262, 362, transfers power to the transmission output 144, 244, 344. The output speed of the powersplit transmission 104, 204, 304 can be controlled by varying the speed of the variable displacement motor 120, 220, 320, in accordance with the planetary gearset 142, 242, 342.

In the hydrostatic mode, the primary range clutch 152, 252, 352, and the secondary range clutch 154, 254, 354 are both engaged while the forward clutch 148, 248, 348 and the reverse clutch 150, 250, 350 are both disengaged. Such an operating condition causes the intermediate shaft 146, 246, 346 to be backdriven. The vehicle driveline 100, 200, 300 is switched from the hydrostatic mode to the powersplit mode when the differential speed between the forward clutch 148, 248, 348 and the reverse clutch 150, 250, 350 and the intermediate shaft 146, 246, 346 is substantially equal to zero.

FIG. 4 is a table indicating an engagement status of each of the forward clutch 148, 248, 348, the reverse clutch 150, 250, 350, the primary range clutch 152, 252, 352, the secondary range clutch 154, 254, 354 and a rotation of the variable displacement motor 120, 220, 320 in each of the operating modes the vehicle driveline 100, 200, 300 may be placed in.

A vehicle driveline similar to the vehicle driveline 100, 200, 300, but not including the freewheel device 106, 170, 180 or the controller 108, 172, 182 cannot handle rapid decelerations of the vehicle driveline. Such rapid decelerations may occur when a portion of the vehicle enters a pile of aggregate material, for example. Consequently, a power source of the vehicle driveline may stall during the rapid deceleration, which is undesirable. The rapid deceleration does not allow for sufficient time for the vehicle driveline to switch from the powersplit mode to the hydrostatic mode, which includes adjusting a position of the moveable swashplates of the variable displacement pump and the variable displacement motor and changing an engagement status of the clutches of the drive range selector and the directional selector.

The vehicle driveline 100, 200, 300 according the embodiments of the invention, include the freewheel device 106, 170, 180 and the controller 108, 172, 182, which allow the vehicle driveline 100, 200, 300 to encounter a rapid deceleration.

When a vehicle the vehicle driveline 100, 200, 300 is incorporated in undergoes the rapid deceleration from the hydrostatic mode, the power source 102, 202, 302 becomes loaded. As it is unlikely that the vehicle output 110, 210, 310 will slip against an operating surface (such as a stone substrate, for example), the loaded condition of the power source 102, 202, 302 and the rapid deceleration of the vehicle driveline 100, 200, 300, causes a fluid pressure within one of the first drive fluid conduits 126, 226, 326 and the second drive fluid conduits 128, 228, 328 to increase significantly. Upon the increase in the fluid pressure within one of the first drive fluid conduits 126, 226, 326 and the second drive fluid conduits 128, 228, 328, increased fluid pressure is detected by the controller 108, 172, 182 through the pressure transducers 124, 224, 324. If the fluid pressure detected by the controller is above a threshold value programmed in the controller 108, 172, 182, the controller 108, 172, 182 will activate the freewheel device 106, 170, 180.

The controller 108, 172, 182 activates the freewheel device 106, 170, 180 by lowering a set point of the valves 164, 166, 174, 186 to a level that militates against the power source 102, 202, 302 stalling. The set point of the valves 164, 166, 174, 186 may be determined by a maximum torque available or a maximum power available of the power source 102, 202, 302 based on a throttle setting of the power source 102, 202, 302.

Upon activation of the freewheel device 106, 170, 180, the vehicle driveline 100, 200, 300 is placed into a freewheel mode. In the freewheel mode, a rotational speed of the vehicle output 110, 210, 310 is determined by a rotational speed of the sun gear 160, 260, 360 and a rotational speed of the carrier 156, 256, 356, which define a rotational speed of the ring gear 158, 258, 358.

When the vehicle driveline 100, 200, 300 placed in the powersplit mode undergoes the rapid deceleration, the power source 102, 202, 302 may become loaded. The controller 108, 172, 182 detects the loaded condition of the power source 102, 202, 302. In response, the controller 108, 172, 182 maintains a near constant level of load on the power source 102, 202, 302 by activating the freewheel device 106, 170, 180. By maintaining the near constant level of load on the power source 102, 202, 302, the fluid pressure within one of the first drive fluid conduits 126, 226, 326 and the second drive fluid conduits 128, 228, 328 is maintained at a near constant level, which results in a similarly near constant application of torque to the vehicle output 110, 210, 310.

During the rapid deceleration, a rotational speed of the sun gear 160, 260, 360 remains at a substantially constant value, as the sun gear 160, 260, 360 is drivingly engaged with the power source 102, 202, 302. A rotational speed of the carrier 156, 256, 356 decreases to zero during the rapid deceleration, where the rapid deceleration causes the vehicle output 110, 210, 310 to come to a stop. As such, a rotational speed of the ring gear 158, 258, 358 must increase; however, in an opposing rotational direction. In the event that a rotational direction of the ring gear 158, 258, 358 is the same as a rotational direction of the sun gear 160, 260, 360, during the rapid deceleration, a rotational speed of the ring gear 158, 258, 358 will decrease and reverse as the vehicle driveline 100, 200, 300 is placed into the freewheel mode.

It is understood that at a greatest value (such as a high speed of the vehicle) of the rotational speed of the sun gear 160, 260, 360 the rotational speed of the ring gear 158, 258, 358 may exceed a maximum rotational speed of the variable displacement motor 120, 220, 320 during the rapid deceleration. In response to the high rotational speed of the sun gear 160, 260, 360, the controller 108, 172, 182 decreases a rotational speed of the power source 102, 202, 302 to militate against damage that may occur to the variable displacement motor 120,220,320.

Upon activation of the freewheel device 106, 170, 180, the controller 108, 172, 182 also performs other tasks. The controller 108, 172, 182 adjusts a position of the moveable swashplate of the variable displacement pump 118, 218, 318 and the variable displacement motor 120, 220, 320 to a new operating point, begins a filling process for engaging the primary range clutch 152, 252, 352, and reduce a pressure on one of the forward clutch 148, 248, 348 and the reverse clutch 150, 250, 350.

When the vehicle driveline 100, 200, 300 is placed in the hydrostatic mode and is desired to be operated at speeds close to zero, the movable swashplate of the variable displacement pump 118, 218, 318 is set to a small swivel angle to deliver a small amount of hydraulic fluid. At the same time, in order to maximize a tractive effort at such low speeds, the movable swashplate of the variable displacement motor 120, 220, 320 is set to a large swivel angle.

Prior to the rapid deceleration that the vehicle driveline 100, 200, 300 may be subjected to, the movable swashplates of the variable displacement pump 118, 218, 318 and the variable displacement motor 120, 220, 320 are determined based on a requested speed of the vehicle at that moment. During the rapid deceleration, the powersplit transmission 104, 204, 304 will be operated in the freewheel mode and an amount of torque will be applied to the vehicle output 110, 210, 310 as the vehicle driveline 100, 200, 300 comes to a complete stop. As a speed of the vehicle approaches zero, the movable swashplates of the variable displacement pump 118, 218, 318 and the variable displacement motor 120, 220, 320 are moved to a new swivel angle.

Within most of the operating range of the vehicle driveline 100, 200, 300, the variable displacement motor 120, 220, 320 will already have a correct swivel angle setting, which is the large swivel angle. The large swivel angle facilitates a maximum torque loading (and thus a maximized tractive effort) of the planetary gearset 142, 242, 342 during the freewheel mode. Within most of the operating range of the vehicle driveline 100, 200, 300, the variable displacement pump 118, 218, 318 will require a correction in the swivel angle setting. When the swivel angle set of the variable displacement pump 118, 218, 318 is set to a positive value (such as during higher vehicle speeds), the swivel angle setting will require inversion.

Upon activation of the freewheel device 106, 170, 180 the controller 108, 172, 182 also begins a filling process for engaging the primary range clutch 152, 252, 352. The filling process of the primary range clutch 152, 252, 352 includes the steps of moving a clutch piston from an end stop position to a position where it starts applying a force onto a clutch pack while minimizing or preventing any torque from being transferred through the primary range clutch 152, 252, 352.

The last process that has to take place upon activation of the freewheel device 106, 170, 180, prior to be able to change from the powersplit mode to the hydrostatic mode is reducing the hydraulic pressure on one of the forward clutch 148, 248, 348 and the reverse clutch 150, 250, 350 to a level (with a certain safety margin) that the forward clutch 148, 248, 348 or the reverse clutch 150, 250, 350 is still capable of transferring all of the torque applied thereto. Such a pressure level can be determined based on the setting of the valves 164, 166, 174, 186 and based upon a specific design of the forward clutch 148, 248, 348 or the reverse clutch 150, 250, 350. When reducing the hydraulic pressure on one of the forward clutch 148, 248, 348 and the reverse clutch 150, 250, 350, a slipping of the forward clutch 148, 248, 348 or the reverse clutch 150, 250, 350 must be prevented, which is caused by reducing the hydraulic pressure too much. The controller 108, 172, 182 is configured to monitor the status of the forward clutch 148, 248, 348 or the reverse clutch 150, 250, 350 based on speed measurements thereof and the controller 108, 172, 182 will increase the hydraulic pressure in the event that a slipping of the forward clutch 148, 248, 348 or the reverse clutch 150, 250, 350 is detected.

After the Controller 108, 172, 182 adjusts a position of the moveable swashplate of the variable displacement pump 118, 218, 318 and the variable displacement motor 120, 220, 320 to a new operating point, completes the filling process for engaging the primary range clutch 152, 252, 352, and reduces a pressure on one of the forward clutch 148, 248, 348 and the reverse clutch 150, 250, 350, the powersplit transmission 104, 204, 304 is ready to be shifted from the powersplit mode into the hydrostatic mode.

A shift sequence from the powersplit mode into the hydrostatic mode comprises a plurality of steps. The first step is to begin a controlled slipping of one of the forward clutch 148, 248, 348 and the reverse clutch 150, 250, 350 (whichever is an engaged position). The controlled slipping reduces a hydraulic pressure to below a threshold value, which maintains a static condition. To perform the controlled slipping, the controller 108, 172, 182 monitors one of the forward clutch 148, 248, 348 and the reverse clutch 150, 250, 350 to determine if the forward clutch 148, 248, 348 or the reverse clutch 150, 250, 350 is in an engaged or a slipping condition based on a speed measurement of the forward clutch 148, 248, 348 or the reverse clutch 150, 250, 350.

Once the forward clutch 148, 248, 348 or the reverse clutch 150, 250, 350 is in a slipping condition, the primary range clutch 152, 252, 352 can be closed using a fixed gradient pressure slope while the load on the power source 102, 202, 302 is maintained at a substantially a constant value by simultaneously decreasing the pressure on the forward clutch 148, 248, 348 or the reverse clutch 150, 250, 350. The fixed gradient pressure slope is performed with respect to a maximum peak power a material the forward clutch 148, 248, 348 or the reverse clutch 150, 250, 350 can handle without being damaged. When the controller 108, 172, 182 detects no differential speed between the components of the primary range clutch 152, 252, 352, the fixed gradient pressure slope engagement is aborted and the primary range clutch 152, 252, 352 is pressurized to a required value for transferring torque in the hydrostatic mode.

At the same the primary range clutch 152, 252, 352 is energized, the forward clutch 148, 248, 348 or the reverse clutch 150, 250, 350 (whichever was in an engaged position) is fully disengaged, and a clutch piston thereof retracts to an end stop. To apply full hydraulic pressure in the hydrostatic mode (which is required for maximum tractive effort) the next step is to deactivate the freewheel device 106, 170, 180. The freewheel device 106, 170, 180 is deactivated by increasing the set point of the relief valves 164, 166 or valve 174, 186 to a maximum setting (so that full hydraulic pressure can be applied to the first drive fluid conduits 126, 226, 326 and the second drive fluid conduits 128, 228, 328 without activating the valves 164, 166 or valve 174, 186 again). It is necessary to perform this step in a gradual way to have a gradual pressure (and thus tractive effort) increase while transitioning into the hydrostatic mode. As in the process of limiting a rotational speed of the variable displacement motor 120, 220, 320 by reducing a rotational speed of the power source 102, 202, 302, the process of increasing the set point of the relief valves 164, 166 or valve 174, 186 to the maximum setting should also be gradually performed. Upon completion of this step, the shift sequence is completed. The vehicle driveline 100, 200, 300 is now operating in the hydrostatic mode, and the vehicle driveline 100, 200, 300 may continue the rapid deceleration while maintaining a maximum push power.

Further, it is understood that by incorporating the pressure transducers 124, 224, 324, an algorithm may be developed to determine an operating point at which the pressure relief valves 164, 166 or valve 174, 186 are always above (a fixed value, for example, such as 20 bar) an actual load (a certain average load will be needed) required in hydrostatic mode. Additionally, when shock loading of the vehicle drivetrain 100, 200, 300 occurs, which the pressure relief valves 164, 166 or valve 174, 186 may be opened to limit the peak pressure within the first drive fluid conduits 126, 226, 326 or the second drive fluid conduits 128, 228, 328. By limiting the peak pressures the components of the vehicle drivetrain 100, 200, 300 are exposed to, a service life of the components can be extended and the vehicle drivetrain 100, 200, 300 can be operated in a more desirable manner.

Figure 5:
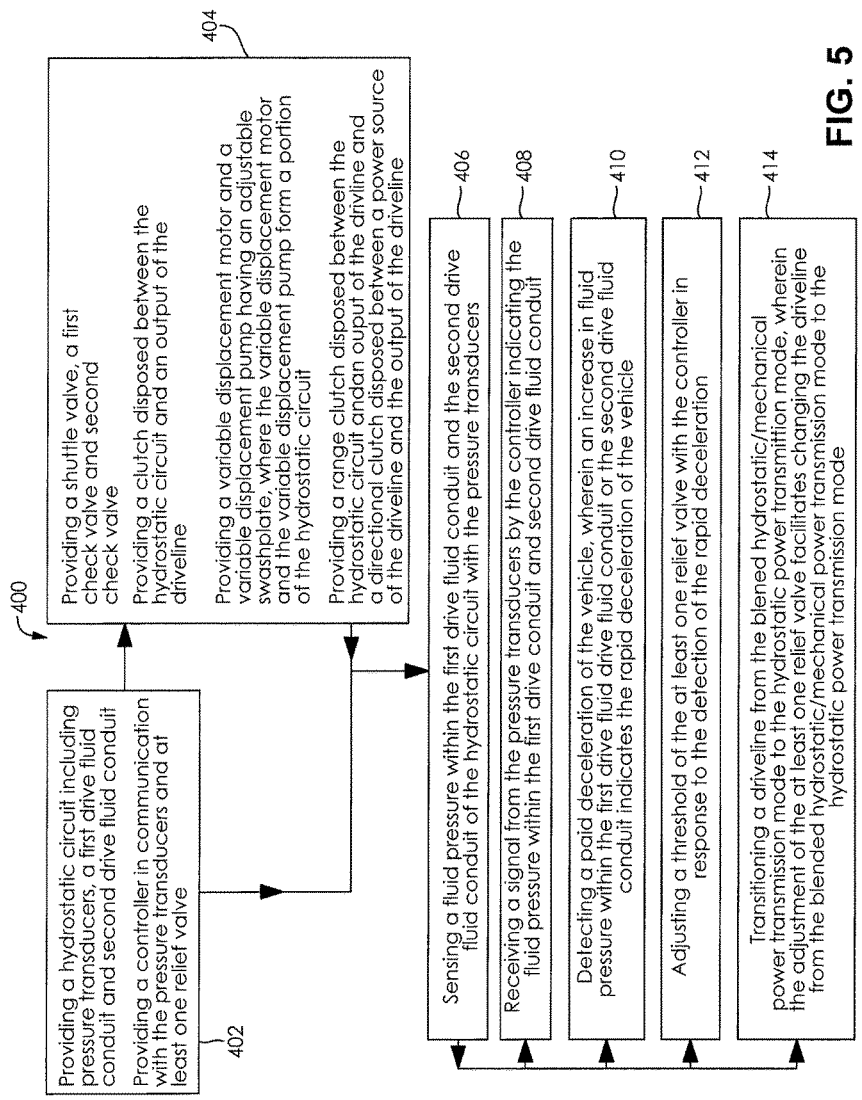
FIG. 5 is a flow cart illustrating a method of operating a driveline for a vehicle according to an embodiment of the present invention.

FIG. 5 is a flow cart illustrating a method of operating a driveline of a vehicle 400 according to an embodiment of the present invention. As illustrated in FIG. 5 of the disclosure, the method of operating a driveline of a vehicle 400 includes first providing a hydrostatic circuit and providing a controller 402. In accordance with this embodiment, the hydrostatic circuit includes pressure transducers, a first drive fluid conduit and a second drive fluid conduit. The controller is in communication with the pressure transducers and at least one relief valve.

It is within the scope of this disclosure that the method of operating a driveline of a vehicle 400 may include the use of additional components. As a result, the method of operating a driveline of a vehicle 400 may include one or more steps 404 of providing additional components. According to the embodiment illustrated in FIG. 5 of the disclosure, the one or more steps 404 of providing additional components may include providing a shuttle valve, a first check valve and a second check valve, where the first and second check valves are disposed in opposite orientations. As a non-limiting example, the at least one relief valve is disposed between the shuttle valve and the first and second check valves. In accordance with an embodiment and as a non-limiting example, the shuttle valve is in fluid communication with the first drive fluid conduits, the first check valve is in fluid communication with the first drive fluid conduit and the second check valve is in fluid communication with the second drive fluid conduit.

As illustrated in FIG. 5 of the disclosure, the one or more steps 404 of providing additional components may include providing a variable displacement motor and a variable displacement pump having an adjustable swashplate. It is within the scope of this disclosure that the variable displacement motor and the variable displacement pump may form a portion of the hydrostatic circuit.

The one or more steps 404 of providing additional components may further include providing a clutch disposed between the hydrostatic circuit and an output of the driveline. When the clutch disposed between the hydrostatic circuit and an output of the driveline is engaged, it facilitates changing the driveline from the blended hydrostatic/mechanical power transmission mode to the hydrostatic power transmission mode.

In accordance with the embodiment illustrated in FIG. 5 of the disclosure, the one or more steps 404 of providing additional components may still further include providing a range clutch disposed between the hydrostatic circuit and an output of the driveline and a directional clutch disposed between a power source of the driveline and the output of the driveline. When the range clutch is engaged and the directional clutch is placed in a slipping condition, it facilitates changing the driveline from the blended hydrostatic/mechanical power transmission mode to the hydrostatic power transmission more.

As illustrated in FIG. 5 of the disclosure, the pressure transducers of the hydrostatic circuit are used to sense the fluid pressure within the first drive fluid conduit and the second drive fluid conduit 406. Additionally, as illustrated in FIG. 5, the controller receives a signal from the pressure transducers 408 indicating the fluid pressure within the first drive fluid conduit and the second drive fluid conduit.

The method of operating a driveline of a vehicle 400 further includes the step of detecting a rapid deceleration 410. An increase in the fluid pressure within the first drive fluid conduit or the second drive fluid conduit indicates a rapid deceleration of the vehicle.

In accordance with the embodiment illustrated in FIG. 5, the method of operating a driveline of a vehicle 400 further includes the step of adjusting the threshold of the at least one relief valve 412. The adjustment of the threshold of the at least one pressure relief valve 412 is performed by the controller in response to the detection of the rapid deceleration of the vehicle 410.

The driveline of the vehicle is then transitioned from the blended hydrostatic/mechanical power transmission mode, to the hydrostatic power transmission mode 414. It is within the scope of this disclosure and as a non-limiting example, that the adjustment of the at least one relief valve 412 facilitates the transitioning of the driveline from the blended hydrostatic/mechanical power transmission mode, to the hydrostatic power transmission mode 414.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A method of operating a driveline for a vehicle which may be operated in a hydrostatic power transmission mode or a blended hydrostatic/mechanical power transmission mode, the method comprising the steps of:
- providing a hydrostatic circuit comprising pressure transducers, the hydrostatic circuit used in the hydrostatic power transmission mode and the blended hydrostatic/mechanical power transmission mode;
- providing a controller in communication with the pressure transducers and at least one relief valve;
- sensing a fluid pressure within a first drive fluid conduit and a second drive fluid conduit of the hydrostatic circuit with the pressure transducers;
- receiving a signal from the pressure transducers by the controller indicating the fluid pressure within the first drive fluid conduit and second drive fluid conduit;
- detecting a rapid deceleration of the vehicle, wherein an increase in fluid pressure within the first drive fluid conduit or the second drive fluid conduit indicates the rapid deceleration of the vehicle;
- adjusting a threshold of the at least one relief valve with the controller in response to the detection of the rapid deceleration; and
- transitioning the driveline from the blended hydrostatic/mechanical power transmission mode to the hydrostatic power transmission mode, wherein the adjustment of the at least one relief valve facilitates changing the driveline from the blended hydrostatic/mechanical power transmission mode to the hydrostatic power transmission mode.

2. The method of operating a driveline for a vehicle according to claim 1, wherein the step of adjusting the threshold of at least one relief valve comprises lowering the threshold of two relief valves.

3. The method of operating a driveline for a vehicle according to claim 1, wherein the at least one relief valve is in fluid communication with the first drive fluid conduit and the second drive fluid conduit of the hydrostatic circuit.

4. The method of operating a driveline for a vehicle according to claim 1, further comprising providing a shuttle valve, a first check valve and a second check valve, wherein the shuttle valve in fluid communication with the first drive fluid conduit and the second drive fluid conduit of the hydrostatic circuit, wherein the first check valve in fluid communication with the first drive fluid conduit of the hydrostatic circuit, wherein the second check valve is in fluid communication with the second drive fluid conduit of the hydrostatic circuit, wherein the pair of check valves are disposed in opposite orientations, and wherein the at least one relief valve is disposed between the shuttle valve and the first and the second check valves.

5. The method of operating a driveline for a vehicle according to claim 1, further comprising providing a variable displacement motor and a variable displacement pump forming a portion of the hydrostatic circuit, wherein the variable displacement motor and the variable displacement pump of the hydrostatic circuit have an adjustable swashplate.

6. The method of operating a driveline for a vehicle according to claim 1, further comprising providing a clutch disposed between the hydrostatic circuit and an output of the driveline, wherein the clutch is prepared to be engaged to facilitate changing the driveline from the blended hydrostatic/mechanical power transmission mode to the hydrostatic power transmission mode.

7. The method of operating a driveline for a vehicle according to claim 1, further comprising providing a range clutch disposed between the hydrostatic circuit and an output of the driveline and a directional clutch disposed between a power source of the driveline and the output of the driveline, wherein the range clutch is prepared to engage and the directional clutch is placed in a slipping condition to facilitate changing the driveline from the blended hydrostatic/mechanical power transmission mode to the hydrostatic power transmission mode.

* * * * *